(12) United States Patent
Ueda et al.

(10) Patent No.: US 9,534,931 B2
(45) Date of Patent: Jan. 3, 2017

(54) ENCODER, ENCODER INSTALLATION METHOD, TORQUE-LIMITING MECHANISM, DRIVING APPARATUS, AND ROBOT APPARATUS

(71) Applicants: DENSO WAVE INCORPORATED, Chita-gun, Aichi (JP); NIKON CORPORATION, Tokyo (JP)

(72) Inventors: Takeshi Ueda, Chita-gun (JP); Kou Ohno, Sendai (JP); Toru Morita, Yokohama (JP)

(73) Assignees: DENSO WAVE INCORPORATED, Aichi (JP); NIKON CORPORATION, Tokyo (JP)

( * ) Notice: Subject to any disclaimer, the term of this patent is extended or adjusted under 35 U.S.C. 154(b) by 123 days.

(21) Appl. No.: 14/502,641

(22) Filed: Sep. 30, 2014

(65) Prior Publication Data
US 2015/0053040 A1 Feb. 26, 2015

Related U.S. Application Data

(63) Continuation of application No. PCT/JP2013/057482, filed on Mar. 15, 2013.

(30) Foreign Application Priority Data

Mar. 30, 2012 (JP) .................................. 2012-078554

(51) Int. Cl.
*H02K 11/00* (2016.01)
*G01D 5/12* (2006.01)
(Continued)

(52) U.S. Cl.
CPC ................. *G01D 5/12* (2013.01); *B25J 19/02* (2013.01); *G01D 5/245* (2013.01); *G01D 5/3473* (2013.01);
(Continued)

(58) Field of Classification Search
CPC ....... H02K 11/21; H02K 7/003; G01D 5/3473
See application file for complete search history.

(56) References Cited

U.S. PATENT DOCUMENTS 4,841,297 A * 6/1989 Bourgeaux ........... G01D 5/2457
250/231.15
2009/0140731 A1 6/2009 Miyashita et al.

FOREIGN PATENT DOCUMENTS

JP    A-11-132792      5/1999
JP    A-2001-241462    9/2001
(Continued)

OTHER PUBLICATIONS

Jun. 11, 2013 International Search Report issued in Application No. PCT/JP2013/057482 (including English Translation).
(Continued)

*Primary Examiner* — Tony Ko
(74) *Attorney, Agent, or Firm* — Oliff PLC

(57) ABSTRACT

An encoder includes a first rotator connectable to a rotating shaft and including a first pattern, and a first detection unit positioned at a non-rotatory member and configured to detect the first pattern. The encoder also includes a second rotator connectable to an output shaft that is rotatable around a predetermined axis and is configured to output rotation caused by the rotating shaft. The encoder also includes a second detection unit positioned at the non-rotatory member and configured to detect the second pattern, and a reference unit configured to position the first detection unit and the second detection unit by a common position reference.

19 Claims, 11 Drawing Sheets

(51) Int. Cl.
    *B25J 19/02*     (2006.01)
    *G01D 5/245*     (2006.01)
    *G01D 5/347*     (2006.01)
    *H02K 7/00*     (2006.01)

(52) U.S. Cl.
    CPC ............... *H02K 7/003* (2013.01); *H02K 11/21* (2016.01); *H02K 11/33* (2016.01); *Y10T 29/49826* (2015.01); *Y10T 74/20317* (2015.01)

(56) References Cited

FOREIGN PATENT DOCUMENTS

| JP | A-2007-113932 | 5/2007 |
|---|---|---|
| JP | A-2009-291874 | 12/2009 |

OTHER PUBLICATIONS

Jun. 11, 2013 Written Opinion issued in Application No. PCT/JP2013/057482 (including English Translation).

\* cited by examiner

ENCODER, ENCODER INSTALLATION METHOD, TORQUE-LIMITING MECHANISM, DRIVING APPARATUS, AND ROBOT APPARATUS

CROSS-REFERENCE TO RELATED APPLICATIONS

This is a continuation of PCT International Application No. PCT/JP2013/057482, filed Mar. 15, 2013, and claims priority to Japanese Application No. 2012-078554, filed on Mar. 30, 2012, the contents of both of which are incorporated herein by reference.

TECHNICAL FIELD

The present invention relates to an encoder, an encoder installation method, a torque-limiting mechanism, a driving apparatus, and a robot apparatus.

BACKGROUND

In a driver in which high positioning accuracy is required in an industrial robot, a machine tool, or the like, a gear-attached motor, which is configured to output rotation of the motor via a reduction gear having high transmission accuracy, may be used. For example, as the gear-attached motor, a motor is disclosed in Japanese Unexamined Patent Application, First Publication No. 2001-241462 which includes a motor main body, a reduction gear which is connected to a rotating shaft of the motor main body in a coaxial state, and an output shaft which is connected to an output side of the reduction gear in a coaxial state.

In the motor described above, in order to accurately perform positioning or the like, it is necessary to control a rotation angle of the output shaft of the reduction gear with high accuracy. Accordingly, a first encoder is mounted on the rotating shaft of the motor, and a second encoder is mounted on the output shaft.

SUMMARY

However, in the above-described motor, the first encoder and the second encoder are positioned to be arranged in an axial direction. Accordingly, positioning between scales of the first encoder and second encoder and a detection unit is complicated, and thus, there is a problem in that an assembly operation easily becomes complicated.

An object of the present invention is to provide an encoder, an encoder installation method, a torque-limiting mechanism, a driving apparatus, and a robot apparatus capable of being easily assembled.

According to a first aspect of the present invention, an encoder includes the following items. A first rotator is connectable to a rotating shaft and includes a first pattern. A first detection unit is positioned at a non-rotatory member and is configured to detect the first pattern. A second rotator is connectable to an output shaft that is rotatable around a predetermined axis and is configured to output rotation caused by the rotating shaft. The second rotator includes a second pattern. A second detection unit is positioned at the non-rotatory member and is configured to detect the second pattern. A reference unit is configured to position the first detection unit and the second detection unit by a common position reference.

According to a second aspect of the present invention, the first rotator is connectable to one end of a first shaft which is a hollow member, and the second rotator is connectable to a portion of a second shaft that passes through the hollow member. The portion of the second shaft protrudes from one end of the first shaft.

According to a third aspect of the present invention, an encoder installation method is provided, including: coupling a first rotator having a first pattern to a rotating shaft, and providing a first detection unit on a non-rotatory member such that the first detection unit is positioned by a predetermined position reference, which is set at a reference unit. The first detection unit is configured to detect the first pattern. The method also includes coupling a second rotator having a second pattern to an output shaft, which is rotatable around a predetermined axis and configured to output rotation of the rotating shaft, and providing a second detection unit on the non-rotatory member such that the second detection unit is positioned by the position reference. The second detection unit is configured to detect the second pattern.

According to a fourth aspect of the present invention, a torque-limiting mechanism is provided, including: a rotating shaft rotatable around a predetermined axis by driving of a driver; an output shaft which is rotatable around the predetermined axis and configured to output rotation of the rotating shaft; a connection portion configured to connect between the rotating shaft and the output shaft and to relatively displace the rotating shaft and the output shaft when torque transmitted from the rotating shaft to the output shaft exceeds a predetermined value; and an encoder according to one of the aforementioned aspects connected to the rotating shaft and configured to detect rotation information of the rotating shaft and the output shaft.

According to a fifth aspect of the present invention, a driving apparatus is provided, including: a driver; a rotating shaft rotatable around a predetermined axis by driving of the driver; an output shaft rotatable around the predetermined axis and configured to output rotation of the rotating shaft; and an encoder according to one of the aforementioned aspects connected to the rotating shaft and the output shaft and configured to detect rotation information of the rotating shaft and the output shaft.

According to a sixth aspect of the present invention, a robot apparatus is provided, including: an arm; and a driving apparatus according to the aforementioned aspect configured to drive the arm.

According to the aspects of the present invention, an encoder, an encoder installation method, a torque-limiting mechanism, a driving apparatus, and a robot apparatus can be provided.

DESCRIPTION OF EMBODIMENTS

Hereinafter, embodiments of the present invention will be described with reference to the drawings.

First Embodiment

Figure 1:
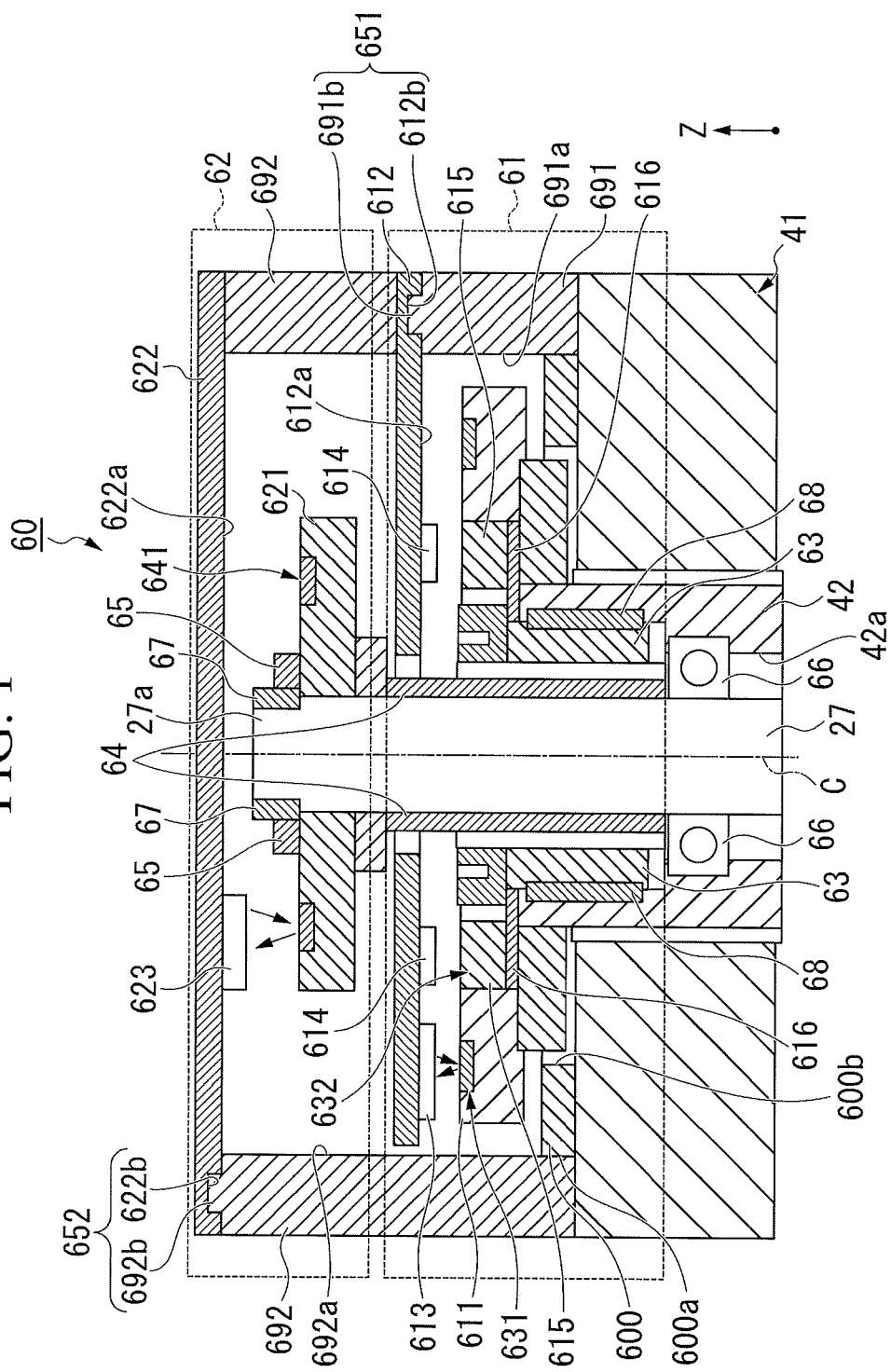
FIG. 1 is a cross-sectional view showing a configuration of an encoder device according to a first embodiment.
Figure 2:
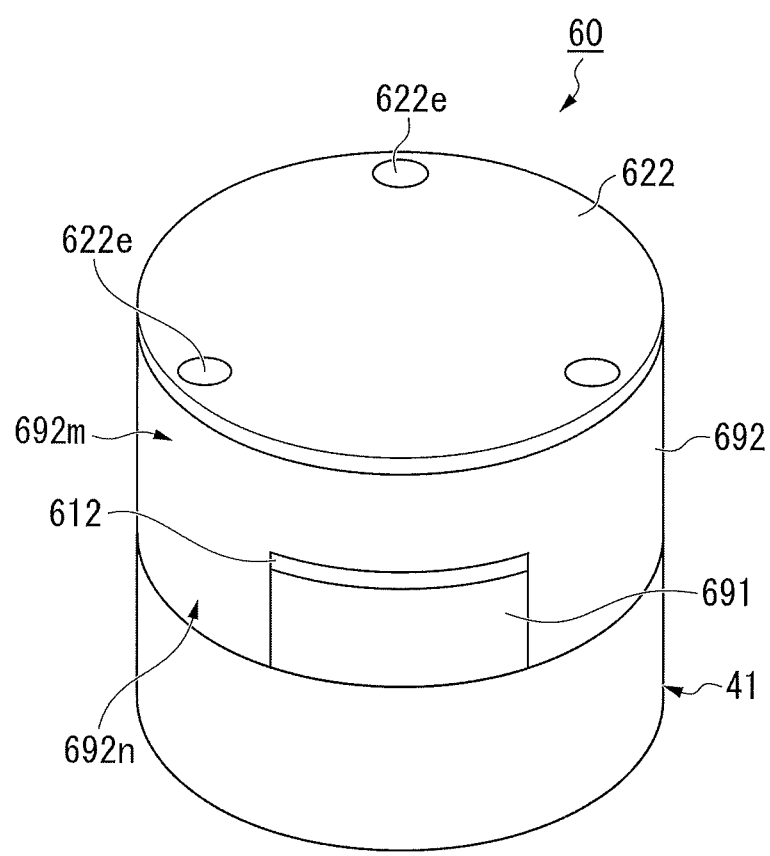
FIG. 2 is a perspective view showing the configuration of the encoder device according to the first embodiment.
Figure 3:
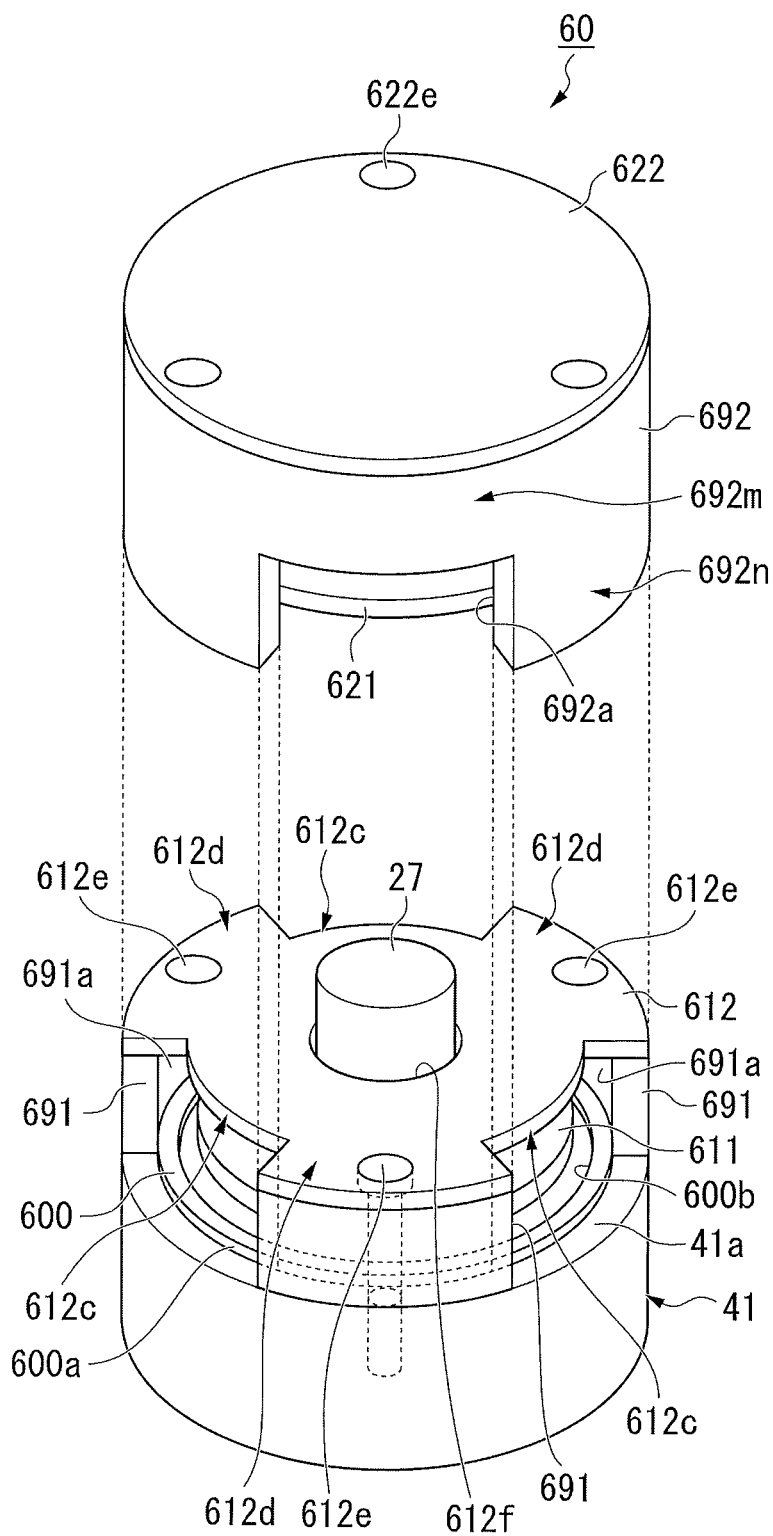
FIG. 3 is an exploded perspective view showing the configuration of the encoder device according to the first embodiment.

FIG. 1 is a cross-sectional view showing a configuration of an encoder device (encoder) 60 according to a first embodiment of the present invention. FIG. 2 is a perspective view showing an outline of the encoder device 60. FIG. 3 is an exploded perspective view showing the outline of the encoder device 60.

As shown in FIGS. 1 to 3, the encoder device 60 includes a first encoder 61 and a second encoder 62. The encoder device 60 can detect rotation information of a drive shaft (rotating shaft) 42 and an output shaft 27 separately.

As shown in FIGS. 1 and 3, the drive shaft 42 is cylindrically formed and includes a hollow member 42a. The drive shaft 42 is connected to a driver 41. The drive shaft 42 is rotated around an axial line C, which becomes a central axis of the drive shaft 42, by a driving force of the driver 41. An outer ring of a bearing 66 (bearing portion) is inserted into the hollow member 42a. The drive shaft 42 can be rotated by a driving apparatus.

The output shaft 27 is cylindrically formed. The output shaft 27 is connected to the drive shaft 42 via a power transmission mechanism (not shown) and outputs rotation of the drive shaft 42, for example, at least a portion of the rotation of the drive shaft 42. The output shaft 27 is provided to penetrate the hollow member 42a of the drive shaft 42. The output shaft 27 is inserted into an inner ring of the bearing 66. The output shaft 27 is disposed to rotate around the axial line C common to the drive shaft 42 by the bearing 66, and can be independently rotated with respect to the drive shaft 42. A tip (upper end in the drawings) 27a of the output shaft 27 protrudes from the drive shaft 42.

The first encoder 61 detects first position information indicating a rotation position of the drive shaft 42. The first encoder 61 includes a first disk 611 (first rotator), a first substrate 612, a light-emitting and -receiving element 613 and a magnetism detection element 614 which are installed at the first substrate 612, and a magnet 615 (magnetic field generator). The first encoder 61 outputs the detected position information as the first position information.

The first disk 611 is fixed to the drive shaft 42 via a screw portion 68 and a fixing member 63 and is integrally rotated with the drive shaft 42. For example, in the first disk 611, a light reflection pattern 631 (first pattern) for obtaining absolute position information (rotation position information) having 20-bit resolution in the drive shaft 42 is formed along a rotation direction of the first disk 611.

The light-emitting and -receiving element 613 radiates light to the above-described light reflection pattern 631 of the first disk 611, and reads light reflected by the light reflection pattern 631 and outputs a first position detection signal.

The magnet 615 is fixed to the first disk 611. For example, the magnet 615 is formed in a ring shape. In the magnet 615, a magnetic pattern 632 for detecting a multi-rotation amount of the drive shaft 42 is formed along the rotation direction of the first disk 611.

The magnetism detection element 614 is positioned at a position corresponding to the magnet 615 on a detection surface 612a of the first substrate 612. The magnetism detection element 614 reads a magnetic field generated from the magnet 615 and outputs a multi-rotation detection signal.

A back yoke 616 is positioned at a −Z axis side surface of the first disk 611. For example, the back yoke 616 is formed using a soft magnetic material. The back yoke 616 dampens at least a portion of the magnetism which operates from the driver 41 to the first encoder 61 side and stabilizes a magnetic characteristic of the magnet 615.

The first substrate 612 includes a detection surface 612a directed to the first disk 611. The light-emitting and -receiving element 613 and the magnetism detection element 614 are provided at the detection surface 612a. A through-hole 612f is formed at a center portion of the first substrate 612. The output shaft 27 penetrates in the +Z axial direction (the side opposite to the driver 41) through the through-hole 612f. The first substrate 612 is supported by a first frame member 691. The first frame member 691 is supported by a non-rotational surface 41a of the driver 41. In addition, the non-rotational surface 41a is included in a portion of the casing of the driver 41, and is formed in a circular shape when viewed from the Z axial direction (refer to FIG. 3).

As shown in FIG. 3, the first substrate 612 includes notches 612c on the outer circumferential portion of the disk. For example, the notches 612c are respectively provided at intervals of 120° in the circumferential direction, that is, are provided at a total of three locations. Accordingly, the first substrate 612 includes protrusions 612d protruding in a radial direction with respect to the notches 612c. The first frame member 691 supports each protrusion 612d of the first substrate 612.

The first frame member 691 is curved along the circumferential shape of the non-rotational surface 41a. In each first frame member 691, an inner surface 691a opposing the first disk 611 configures a portion of a cylindrical surface. Each protrusion 612d is fixed to the non-rotational surface 41a of the driver 41 along with the first frame member 691 by a fixing member 612e such as a screw.

In addition, the second encoder 62 detects second position information indicating the rotation position of the output shaft 27. The second encoder 62 includes a second disk 621 (second rotator), a second substrate 622, and a light-emitting and -receiving element 623 which is installed at the second substrate 622.

The second disk 621 is fixed to a portion, which protrudes in the +Z axial direction from the first substrate 612 on the output shaft 27, via a sleeve 64. The sleeve 64 is fixed by a nut 65 via a screw portion 67. Accordingly, pressurization is applied to the bearing 66. Similar to the first disk 611, for example, in the second disk 621, a light reflection pattern 641 (second pattern) for obtaining absolute position information (rotation position information) having 20-bit resolution is formed along a rotation direction of the second disk 621.

The light-emitting and -receiving element 623 reads the above-described light reflection pattern 641 of the second disk 621 and outputs a second position detection signal. In this way, the encoder device 60 of the present embodiment includes the configuration in which a two-step disk (first disk 611 and second disk 621) is coaxially positioned.

The second substrate 622 includes a detection surface 622a directed to the second disk 621. The light-emitting and -receiving element 623 is provided at the detection surface 622a. The second substrate 622 is supported by a second frame member 692. The second frame member 692 is supported by the non-rotational surface 41a of the driver 41.

As shown in FIG. 3, the second frame member 692 includes a cylindrical portion 692m which is formed along the outer circumference of the second substrate 622, and a protrusion 692n which protrudes in the −Z axial direction from the cylindrical portion 692m. The cylindrical portion 692m is provided to surround the second disk 621. The protrusion 692n is inserted between the first frame members 691 and is supported by the peripheral edge of the non-rotational surface 41a. The second substrate 622 is fixed to the non-rotational surface 41a of the driver 41 to penetrate the cylindrical portion 692m and the protrusion 692n of the second frame member 692 by fixing members 622e such as a screw.

As shown in FIG. 2, when the protrusion 692n is inserted between the first frame members 691, the first frame member 691 and the protrusion 692n come into contact with each other so that there is no gap between the first frame member 691 and the protrusion 692n. In the second frame member 692 including the cylindrical portion 692m and the protrusion 692n, an inner surface 692a is formed of the same cylindrical surface.

As shown in FIGS. 1 and 3, a position reference unit 600 is fixed to the non-rotational surface 41a of the driver 41 via a bonding agent (not shown) or the like. The position reference unit 600 is formed in a ring shape, and an outer circumferential surface 600a becomes the cylindrical surface. The position reference unit 600 is positioned so that the center of the outer circumferential surface 600a is coincident with the axial line C.

The inner surface 691a of the first frame member 691 abuts the outer circumferential surface 600a. In the present embodiment, the diameter of the inner surface 691a is the same as the diameter of the outer circumferential surface 600a. Accordingly, the inner surface 691a abuts the outer circumferential surface 600a, and thus, the first frame member 691 and the position reference unit 600 are positioned.

In addition, the inner surface 692a of the second frame member 692 abuts the outer circumferential surface 600a. In the present embodiment, the diameter of the inner surface 692a is the same as the diameter of the outer circumferential surface 600a. Accordingly, the inner surface 692a abuts the outer circumferential surface 600a, and thus, the second frame member 692 and the position reference unit 600 are positioned.

As described above, the first frame member 691 and the second frame member 692 are positioned by using the same outer circumferential surface 600a in common. Accordingly, the outer circumferential surface 600a becomes a common reference position between the first frame member 691 and the second frame member 692.

In addition, as shown in FIG. 1, a recessed portion 612b (first recessed portion) is provided at the detection surface 612a of the first substrate 612. A protruding portion 691b (first protruding portion) is provided at the +Z axis side surface of the first frame member 691. The protruding portion 691b is inserted into the recessed portion 612b. The protruding portion 691b and the recessed portion 612b are engaged with each other, and thus, the first substrate 612 and the first frame member 691 are positioned. In this way, by the protruding portion 691b and the recessed portion 612b, a first alignment member 651 which aligns the position of the first substrate 612 with respect to the outer circumferential surface 600a is configured. The first alignment member 651 is configured to regulate deviation in a parallel direction between the first substrate 612 and the first frame member 691 and deviation in the rotation direction. As this configuration, for example, a regulating portion in the rotation direction may be provided with the shapes of the protruding portion 691b and the recessed portion 612b, and a plurality of protruding portions and recessed portions may be provided for each first frame member 691.

Similarly, a recessed portion 622b (second recessed portion) is provided at the detection surface 622a of the second substrate 622. A protruding portion 692b (second protruding portion) is provided at the +Z axis side surface of the second frame member 692. The protruding portion 692b is inserted into the recessed portion 622b. The protruding portion 692b and the recessed portion 622b are engaged with each other, and thus, the second substrate 622 and the second frame member 692 are positioned. In this way, by the protruding portion 692b and the recessed portion 622b, a second alignment member 652 which aligns the position of the second substrate 622 with respect to the outer circumferential surface 600a is configured. Similar to the first alignment member 651, the second member 652 is configured to regulate deviation in the parallel direction between the second substrate 622 and the second frame member 692 and deviation in the rotation direction.

Next, a procedure of assembling the encoder device 60 configured as described above will be described.

Figure 4:
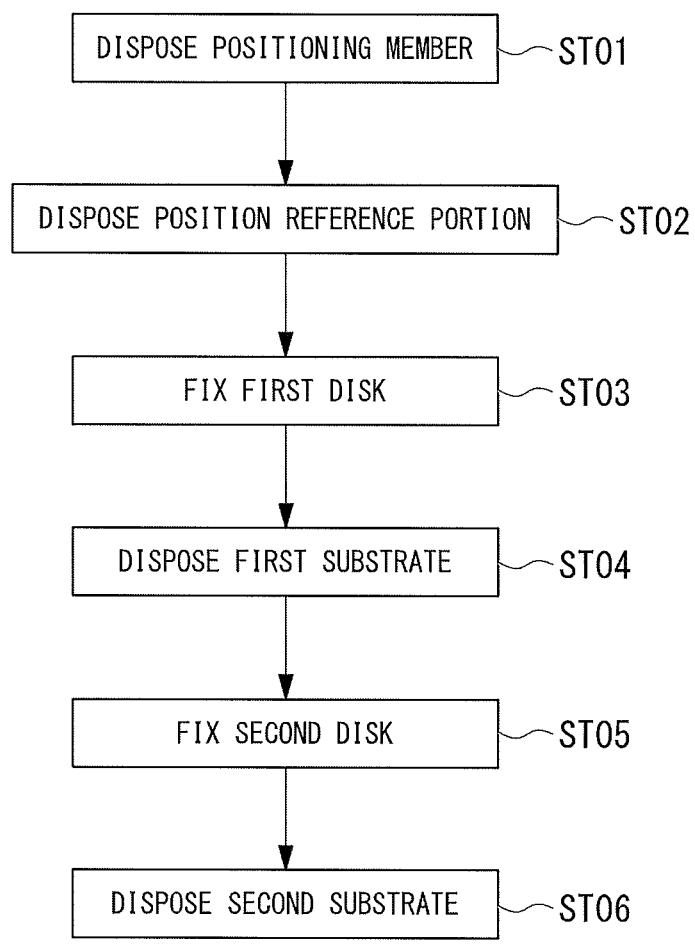
FIG. 4 is a flowchart showing an assembly method of the encoder device according to the first embodiment.

FIG. 4 is a flowchart showing the assembly procedure of the encoder device 60. The assembly of the encoder device 60 is performed according to processes of ST01 to ST06 of FIG. 4.

Figure 5:
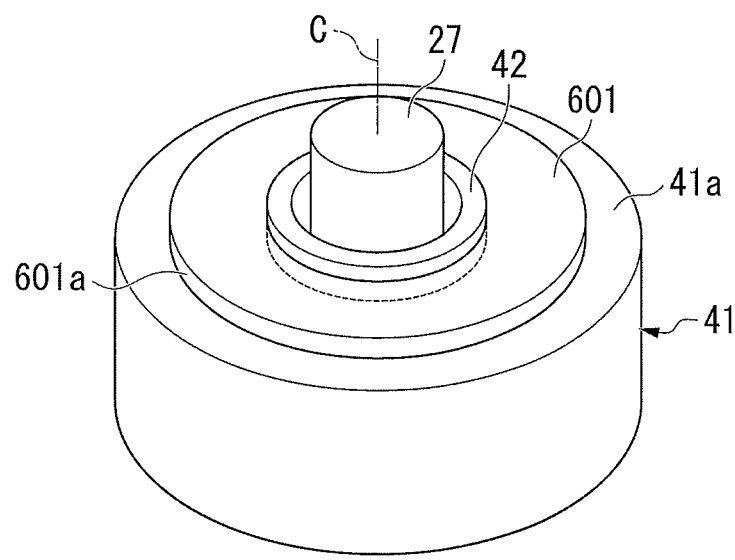
FIG. 5 is a perspective view showing an assembly process of the encoder device according to the first embodiment.

First, a positioning member is positioned at the non-rotational surface 41a of the driver 41 (ST01). In this process, as shown in FIG. 5, a positioning member 601, which is formed in a ring shape so that the dimension in the radial direction is the same, is fitted to the drive shaft 42. As the positioning member 601, a positioning member is used which is formed so that a diameter of an outer circumferential surface 601a is the same as a diameter of an inner circumferential surface 600b of the position reference unit 600 and a diameter of an inner circumferential surface 601b is the same as a diameter of the outer circumferential surface of the drive shaft 42. Accordingly, the center of the outer circumferential surface 601a of the positioning member 601 is coincident with the axial line C.

Figure 6:
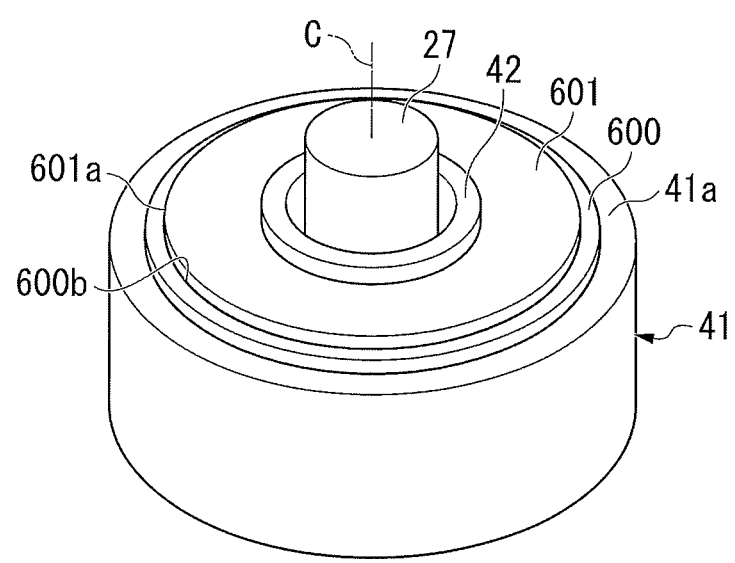
FIG. 6 is a perspective view showing the assembly process of the encoder device according to the first embodiment.
Figure 7:
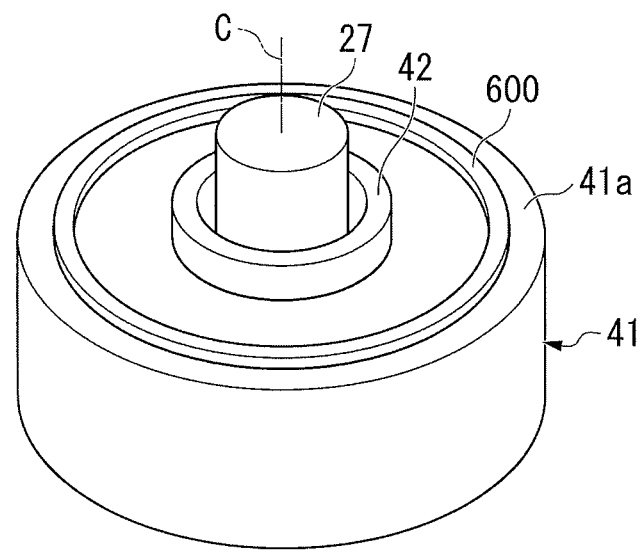
FIG. 7 is a perspective view showing the assembly process of the encoder device according to the first embodiment.

Next, the position reference unit 600 is fixed to the non-rotational surface 41a of the driver 41 (ST02). In this process, as shown in FIG. 6, the position reference unit 600 is fitted to the positioning member 601. Since the diameter of the outer circumferential surface 601a of the positioning member 601 is the same as the diameter of the inner circumferential surface 600b of the position reference unit 600, the position reference unit 600 is positioned so that there is no gap between the position reference unit 600 and the positioning member 601. Accordingly, the center of the position reference unit 600 is positioned to be coincident with the axial line C. Thereafter, the position reference unit 600 is fixed to the non-rotational surface 41a using a bonding agent (not shown) or the like. After the position reference unit 600 is fixed, as shown in FIG. 7, the positioning member 601 is removed.

Next, the first disk 611 is fixed to the drive shaft 42 (ST03). In this process, the first disk 611 is fastened to the drive shaft 42 via the screw portion 68 and the fixing member 63. Accordingly, the first disk 611 is integrally rotated with the drive shaft 42.

Figure 8:
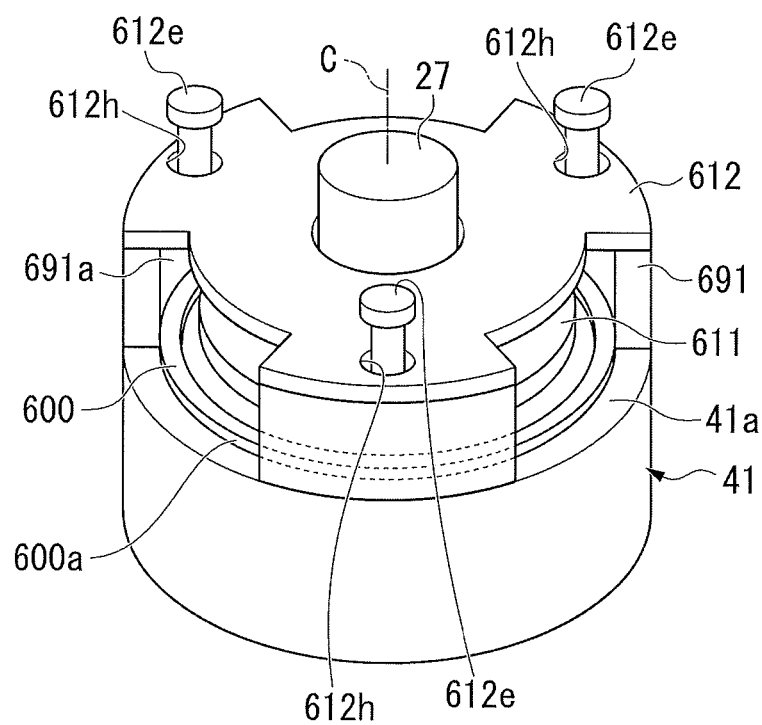
FIG. 8 is a perspective view showing the assembly process of the encoder device according to the first embodiment.

Next, the first substrate 612 is positioned at the non-rotational surface 41a (ST04). In this process, first, the first substrate 612 is temporarily fixed by fixing members 612e in a state where the recessed portion 612b of the first substrate 612 and the protruding portion 691b of the first frame member 691 are engaged with each other. As shown in FIG. 8, each fixing member 612e is inserted into an opening portion 612h which is formed at the first substrate 612 in advance. After the first substrate is temporarily fixed, the inner surface 691a of the first frame member 691 abuts the outer circumferential surface 600a of the position reference unit 600 in a state where a positional relationship between the first substrate 612 and the first frame member 691 is maintained, and thus, the first frame member 691 is positioned.

Moreover, the position of the opening portion 612h, the position of the recessed portion 612b, and the position of the protruding portion 691b are set in advance so that positions between the light reflection pattern 631 and the magnetic pattern 632, and the light-emitting and -receiving element 613 and the magnetism detection element 614 mounted on the first substrate 612 are optimal. Accordingly, the recessed portion 612b and the protruding portion 691b are engaged with each other and are temporarily fixed by the fixing members 612e, and the first frame member 691 is positioned, and thus, the portions between the light-emitting and -receiving element 613 and the magnetism detection element 614, and the light reflection pattern 631 and the magnetic pattern 632 are positioned so as to be in an optimal state. In this state, the first substrate 612 and the first frame member 691 are permanently fixed to each other by the fixing members 612e.

Next, the second disk 621 is fixed to the output shaft 27 (ST05). In this process, the second disk 621 is mounted in a state where the sleeve 64 is mounted to the output shaft 27, and thus, the second disk 621 is fixed by the nut 65 via the screw portion 67. Accordingly, the second disk 621 is integrally rotated with the output shaft 27.

Figure 9:
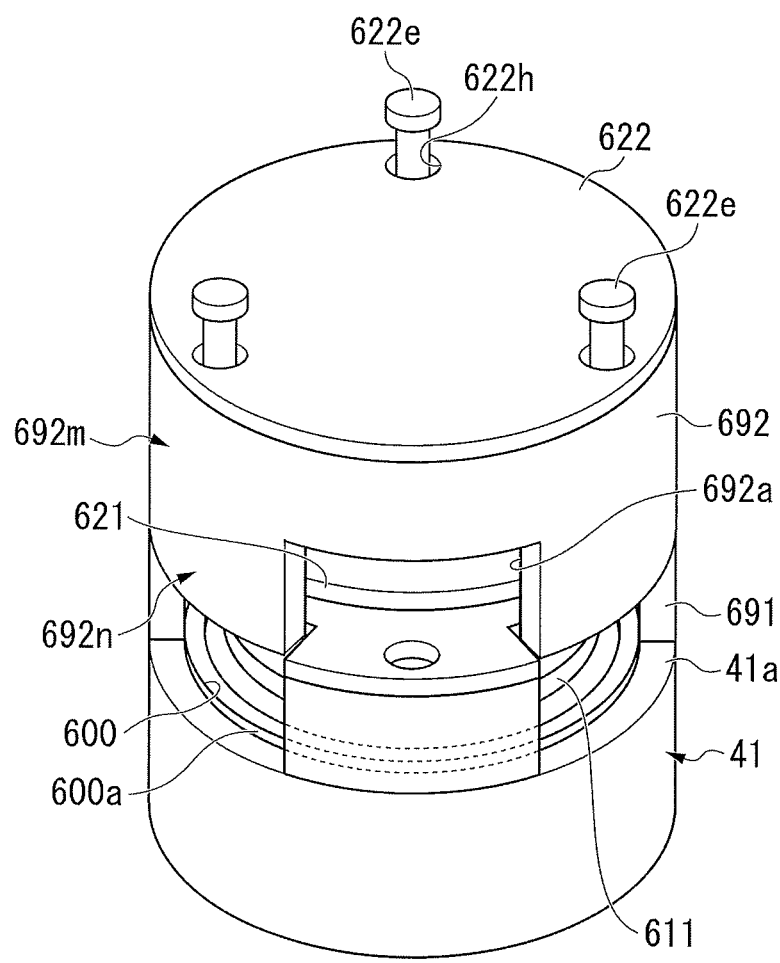
FIG. 9 is a perspective view showing the assembly process of the encoder device according to the first embodiment.

Next, the second substrate 622 is positioned at the non-rotational surface 41a (ST06). In this process, first, the second substrate 622 is temporarily fixed by the fixing members 622e in a state where the recessed portion 622b of the second substrate 622 and the protruding portion 692b of the second frame member 692 are engaged with each other. The fixing members 622e are inserted into opening portions 622h which are formed at the second substrate 622 in advance. In this state, as shown in FIG. 9, each protrusion 692n of the second frame member 692 is inserted between the first frame members 691. Thereafter, the inner surface 692a of each second frame member 692 abuts the outer circumferential surface 600a of the position reference unit 600, and thus, the second frame member 692 is positioned.

In addition, the position of the recessed portion 622b, the position of the opening portion 622h, and the position of the protruding portion 692b are set in advance so that the position between the light reflection pattern 641 and the light-emitting and -receiving element 623 mounted on the second substrate 622 is optimal. Accordingly, the recessed portion 622b and the protruding portion 692b are engaged with each other and are temporarily fixed by the fixing members 622e, and the second frame member 692 is positioned, and thus, the portion between the light-emitting and -receiving element 623 and the light reflection pattern 641 is positioned so as to be in an optimal state. Thereafter, the second substrate 622 and the second frame member 692 are permanently fixed to each other by the fixing members 622e.

According to the above-described processes, the encoder device 60 is assembled via a first fixing process of fixing the first disk 611 including the light reflection pattern 631 and the magnetic pattern 632 to the drive shaft 42 rotated around the predetermined axial line C, a first disposition process of disposing the first substrate 612 detecting the light reflection pattern 631 and the magnetic pattern 632 on the non-rotational surface 41a so as to be positioned by the predetermined position reference 600a set to the position reference unit 600, a second fixing process of fixing the second disk 621 including the light reflection pattern 641 to the output shaft 27 which is rotated around the predetermined axial line C and outputs rotation of the drive shaft 42, for example, at least a portion of the rotation of the drive shaft 42, and a second disposition process of disposing the second substrate 622 detecting the light reflection pattern 641 on the non-rotational surface 41a so as to be positioned by the position reference 600a. Accordingly, even when positioning with signal detection is not performed, the portion between the first disk 611 and the first substrate 612 and the portion between the second disk 621 and the second substrate 622 can be positioned to the preset positions. Therefore, the positioning at the time of the assembly is easily performed. Accordingly, the assembly can be easily performed.

As described above, the encoder device 60 according to the present embodiment includes the first disk 611 to be fixed to the drive shaft 42 rotated around the axial line C and has the light reflection pattern 631 and the magnetic pattern 632; the first substrate 612 which is positioned at the non-rotational surface 41a and detects the light reflection pattern 631 and the magnetic pattern 632; the second disk 621 which is rotated around the axial line C, is fixed to the output shaft 27 outputting rotation of the drive shaft 42, for example, at least a portion of the rotation of the drive shaft 42, and includes the light reflection pattern; the second substrate 622 which is positioned at the non-rotational surface 41a and detects the light reflection pattern 641; and the position reference unit 600 which positions the first substrate 612 and the second substrate 622 by the common position reference 600a, and thus, the positioning at the time of the assembly is easily performed. Accordingly, the assembly can be easily performed.

Second Embodiment

Next, a second embodiment of the present invention will be described. In the present embodiment, a case in which the encoder device 60 described in the first embodiment is applied to a robot apparatus 100 and a driving apparatus 1 will be described. Hereinafter, the same reference numerals are assigned to the configurations common to the first embodiment.

Figure 10:
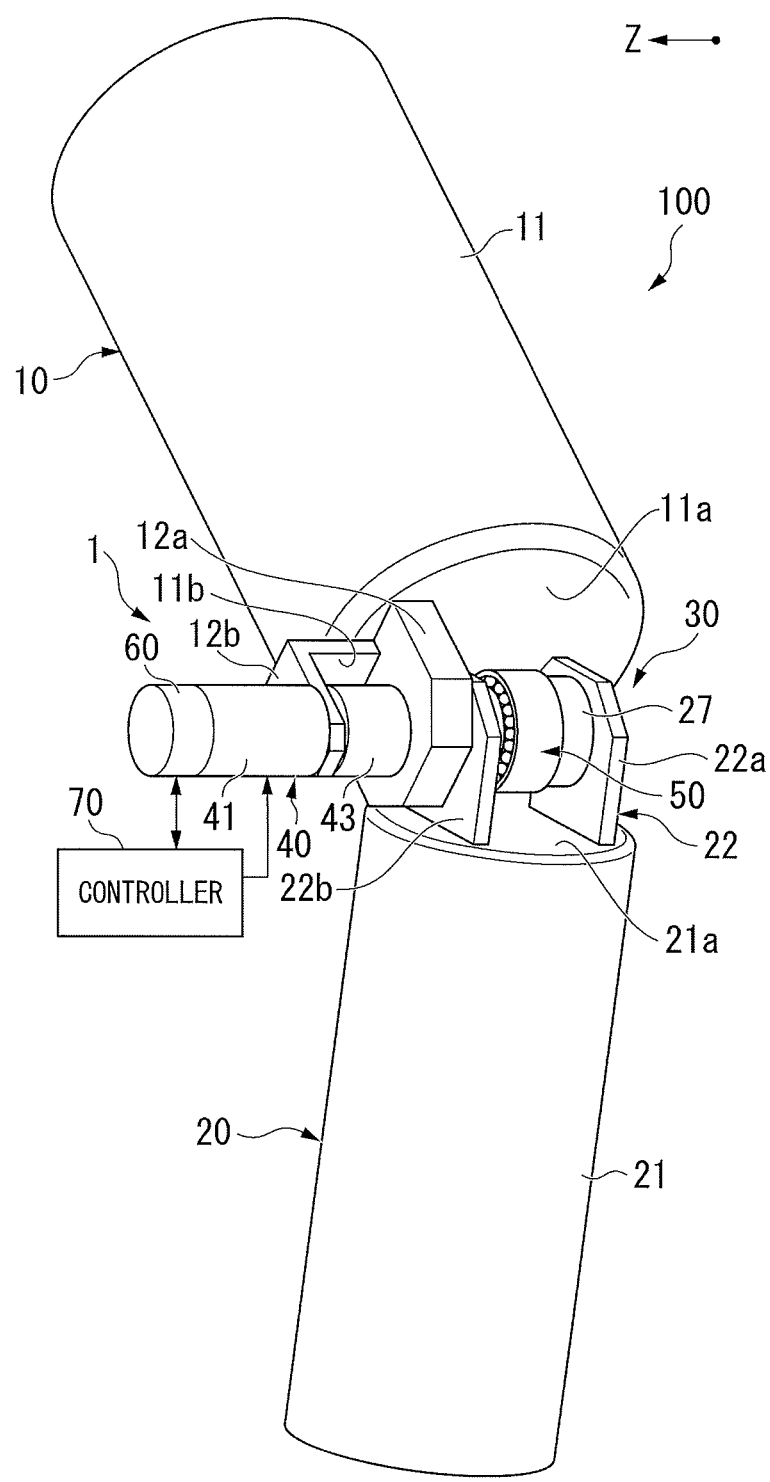
FIG. 10 is a perspective view showing configurations of a driving apparatus and a robot apparatus according to a second embodiment.

FIG. 10 is a perspective view showing a configuration of the robot apparatus 100 according to the present embodiment.

As shown in FIG. 10, the robot apparatus 100 includes a first arm 10, a second arm 20, and the driving apparatus 1. The first arm 10 and the second arm 20 are connected to each other by a connection portion 30. The driving apparatus 1 is provided at the connection portion 30. The driving apparatus 1 includes a rotation mechanism 40, a torque-limiting mechanism 50, the encoder device 60, and a controller 70, and rotates the second arm 20 based on the connection portion 30.

The first arm 10 includes a base portion 11 and a bearing 12. The base portion 11 is formed in a columnar shape (solid) or a cylindrical shape (hollow) and configures a portion of a framework of the robot apparatus 100. The base portion 11 is mounted to a rotating shaft (not shown) of the robot apparatus 100 and is provided so as to be rotated in a predetermined direction about the rotating shaft.

The bearing 12 is provided at an end surface 11a of the base portion 11. For example, the bearing 12 includes a first bearing 12a and a second bearing 12b. The first bearing 12a and the second bearing 12b are positioned so as to be arranged in one direction (for example, the Z axial direction).

The first bearing 12a is directly provided on the end surface 11a. Moreover, the second bearing 12b is provided via a reduction gear 43 (for example, gear) which extends from the first bearing 12a to the outside of the end surface 11a.

The second arm (arm) 20 includes a base portion 21, a bearing 22, and an output shaft 27. Similar to the base portion 11 of the first arm 10, the base portion 21 is formed in a columnar shape (solid) or a cylindrical shape (hollow), and configures a portion of a framework of the robot apparatus 100. The bearing 22 is provided at an end surface 21a of the base portion 21. The bearing 22 includes a third bearing 22a and a fourth bearing 22b. The third bearing 22a and the fourth bearing 22b are positioned so as to be arranged in one direction (for example, the Z axial direction).

The third bearing 22a and the fourth bearing 22b are directly provided on the end surface 21a. The third bearing 22a and the fourth bearing 22b of the second arm 20 are positioned with a predetermined interval therebetween so that a torque-limiting mechanism 50 is installed.

The output shaft 27 is a shaft to which a rotating force by the rotation mechanism 40 is transmitted and which is rotated. The output shaft 27 is integrally provided with the third bearing 22a on the +Z axis side of the third bearing 22a. For example, the output shaft 27 is formed in a columnar shape or a cylindrical shape and is positioned so that the axial line direction is parallel with the Z axial direction.

The rotation mechanism 40 is connected to the reduction gear 43 via the second bearing 12b. The rotation mechanism 40 includes the driver 41 and the drive shaft 42 (FIG. 11), rotates the drive shaft 42, and drives the second arm 20 by rotating the output shaft 27.

For example, as the encoder device 60, the encoder device described in the first embodiment can be used. For example, the encoder device 60 is connected to the rotation mechanism 40 and detects rotation position information (for example, angular position) of the output shaft 27 and the drive shaft 42 described below. For example, the encoder device 60 detects a three-dimensional position and a posture of the second arm 20.

For example, the torque-limiting mechanism 50 is positioned at the third bearing 22a and the fourth bearing 22b of the second arm 20. The torque-limiting mechanism 50 connects the drive shaft 42 and the output shaft 27 so that the rotating force of the drive shaft 42 is transmitted to the output shaft 27 to which the second arm 20 is connected. When torque equal to or greater than a predetermined torque-allowable value is generated between the drive shaft 42 and the output shaft 27, the torque-limiting mechanism 50 can cause relative displacement (for example, sliding) to be generated with respect to the drive shaft 42 and the output shaft 27. As an example, when torque equal to or greater than a predetermined torque-allowable value is generated between the drive shaft 42 and the output shaft 27, the torque-limiting mechanism 50 generates the relative displacement between the drive shaft 42 and the output shaft 27. For example, as the torque-limiting mechanism 50, a torque-limiting mechanism (torque limiter) having a well-known configuration such as a coupling type, a flange type, a non-contact type, or a linear type may be used.

The controller 70 generally controls the driving apparatus 1, that is, the rotation mechanism 40, the torque-limiting mechanism 50, and the encoder device 60.

Figure 11:
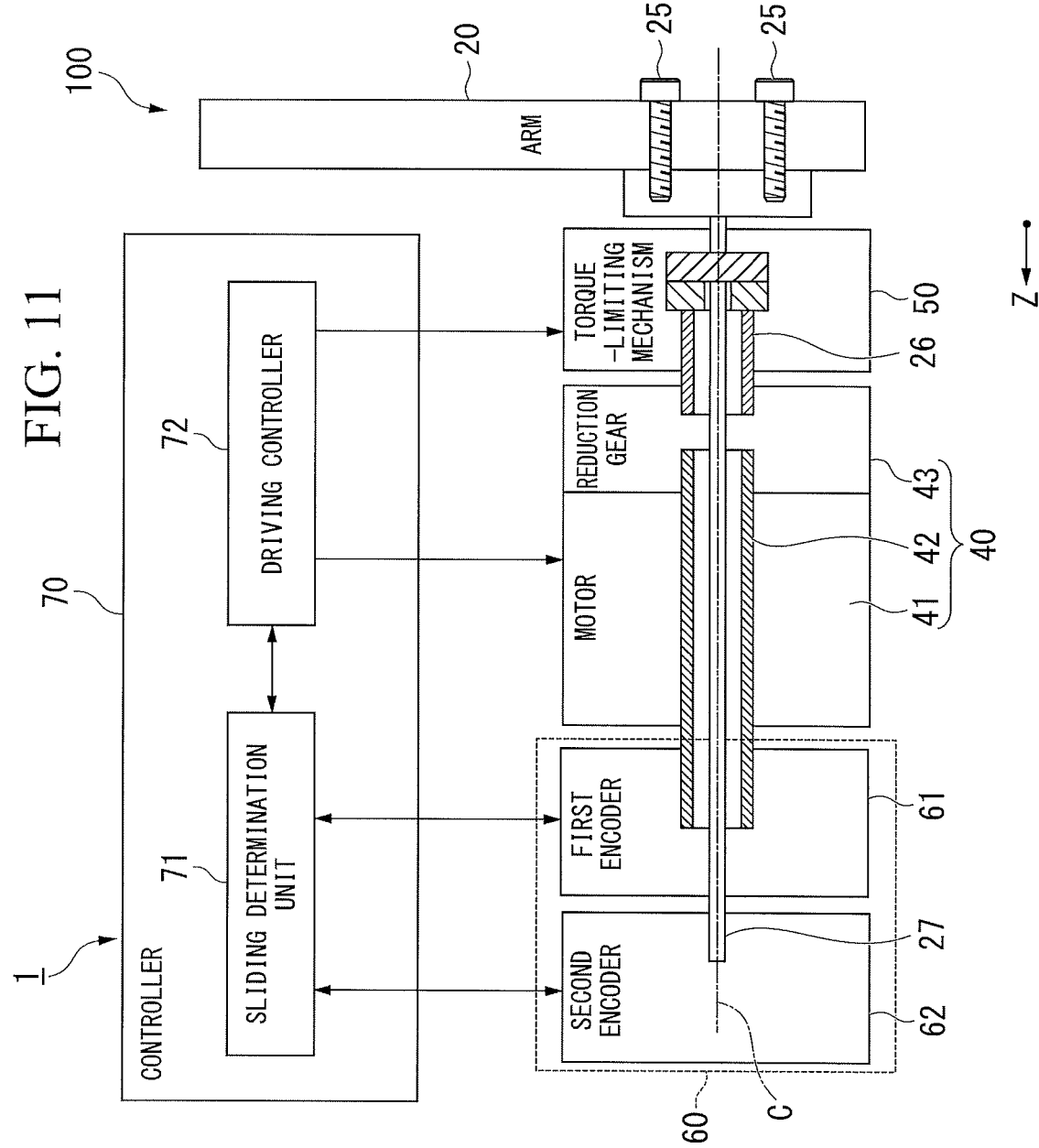
FIG. 11 is a block diagram showing the configurations of the driving apparatus and the robot apparatus according to the second embodiment.
Figure 12:
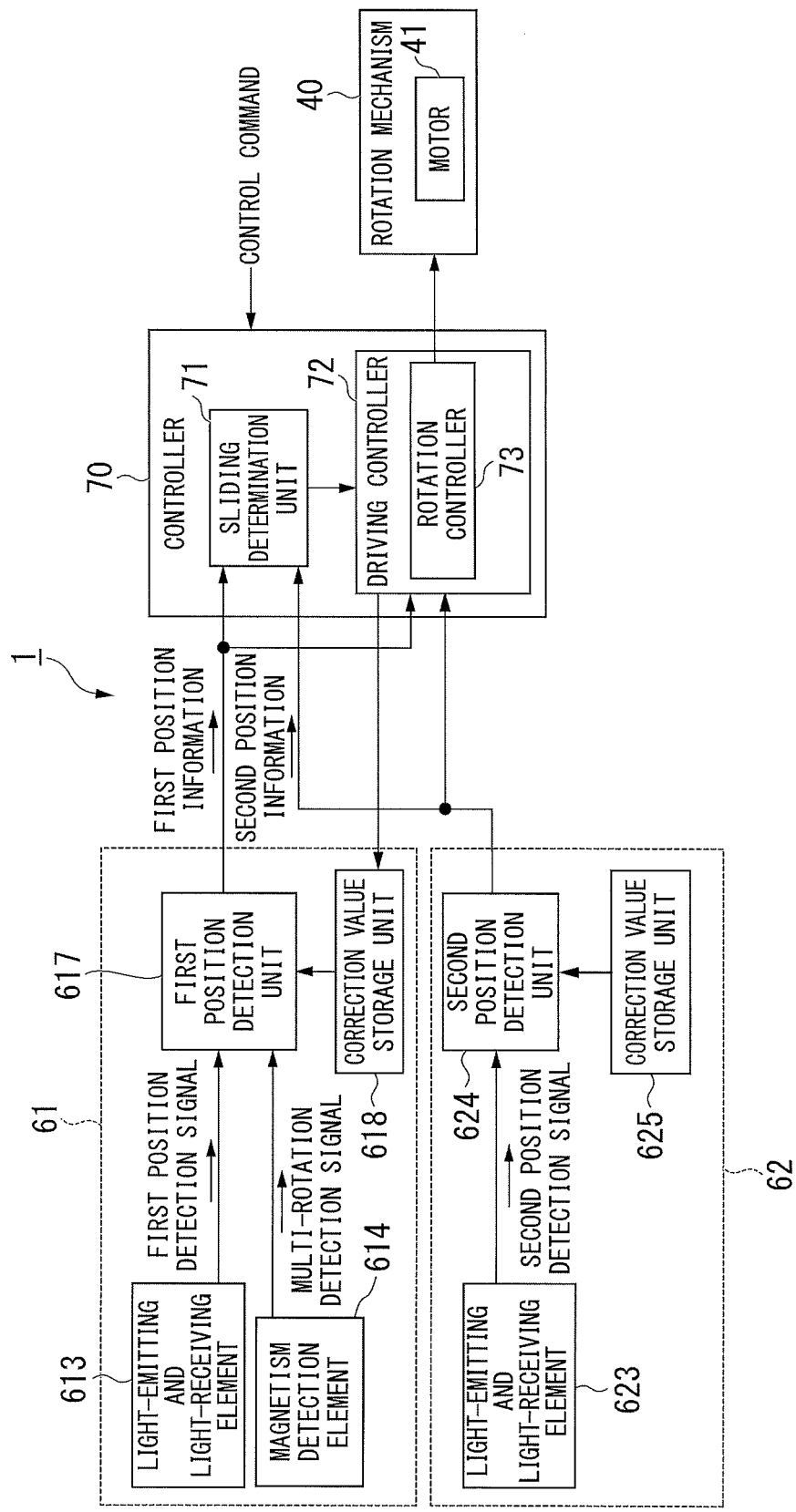
FIG. 12 is a block diagram showing the configuration of the driving apparatus according to the second embodiment.

Next, the configuration of the driving apparatus 1 according to the present embodiment will be described. FIGS. 11 and 12 are block diagrams showing the configuration of the driving apparatus 1. In FIGS. 11 and 12, the same reference numerals are assigned to the same configurations as those of FIG. 10, and descriptions thereof are omitted.

As shown in FIGS. 11 and 12, the driving apparatus 1 includes the rotation mechanism 40, the torque-limiting mechanism 50, the encoder device 60, and the controller 70.

In the present embodiment, as an example, one end of the drive shaft 42 is connected to the first encoder 61, and the other end thereof is connected to the torque-limiting mechanism 50 via the reduction gear 43. In addition, the drive shaft 42 is a hollow drive shaft which is formed in a hollow shape. In addition, in the output shaft 27 which is a portion of the output shaft 27, at least a portion of the output shaft 27 is positioned at the inner side of the hollow drive shaft (drive shaft 42), one end of the output shaft 27 is connected to the second arm 20 and the torque-limiting mechanism 50, and the other end of the output shaft 27 is connected to the second encoder 62.

The driver 41 (rotation drive source) of the rotation mechanism 40 rotates the drive shaft 42 which is a hollow drive shaft. Moreover, the rotating force generated by the driver 41 is transmitted to the torque-limiting mechanism 50 via the reduction gear 43.

For example, the reduction gear 43 (power transmission portion) is a gear which reduces the revolution speed of the drive shaft 42 to 1/50. The reduction gear 43 reduces the rotation of the drive shaft 42 and transmits the reduced rotation to the torque-limiting mechanism 50 via a transmission shaft 26. In this embodiment, for example, when the drive shaft 42 is rotated 50 times, the reduction gear 43 reduces the rotation so that the transmission shaft 26 and the output shaft 27 are rotated once.

As described above, the torque-limiting mechanism 50 transmits the rotating force of the drive shaft 42 to the output shaft 27 to which the second arm 20 is connected, and generates sliding (relative displacement) when a predetermined torque-allowable value is generated between the drive shaft 42 and the output shaft 27. That is, when the torque equal to or greater than a predetermined allowable value is generated in at least one of the drive shaft 42 and the output shaft 27, the torque-limiting mechanism 50 generates the relative displacement (for example, sliding). In addition, in the present embodiment, for example, the output shaft 27 is fixed to the second arm 20 by bolts 25.

As shown in FIG. 12, the first encoder 61 includes the light-emitting and -receiving element 613, the magnetism detection element 614, a first position detection unit 617 (first detection unit), and a correction value storage unit 618.

The light-emitting and -receiving element 613 detects the pattern formed on the first disk 611 (FIG. 1), and outputs the first position detection signal which is a signal indicating the absolute position (rotation position) of the drive shaft 42.

For example, the magnetism detection element 614 is a Hall element, detects the magnetism of the magnet 615 provided inside the first disk 611, and converts the detected magnetism into electric signals. Here, the magnetism detection element 614 detects the magnetism of the magnet 615 and outputs a multi-rotation detection signal for detecting a multi-rotation amount (revolution speed) of the drive shaft 42.

The correction value storage unit 618 stores a predetermined correction value which corrects the first position information detected by the first encoder 61. The predetermined correction value is changed by the controller 70 in return processing in which sliding is eliminated by the torque-limiting mechanism 50 as described below.

The first position detection unit 617 calculates the first position information indicating the information of the absolute position (rotation position) of the drive shaft 42 based on the first position detection signal output by the light-emitting and -receiving element 613 and the multi-rotation detection signal output by the magnetism detection element 614. The first position detection unit 617 outputs the calculated first position information to the controller 70. In addition, when the first position information is calculated, the first position detection unit 617 performs correction of the calculated position information based on the predetermined correction value stored in the correction value storage unit 618, and outputs the corrected position information as the first position information. Moreover, since the first encoder 61 corresponds to the multi-rotation, the first position information is position information corresponding to the multi-rotation. For example, the first position detection unit 617 and the correction value storage unit 618 are provided at the first substrate 612 (non-rotatory member).

Moreover, as shown in FIG. 12, the second encoder 62 includes the light-emitting and -receiving element 623, a second position detection unit 624, and a correction value storage unit 625.

The light-emitting and -receiving element 623 detects the pattern formed at the second disk 621 (FIG. 1) and outputs the second position detection signal which is a signal indicating the absolute position (rotation position) of the output shaft 27. The correction value storage unit 625 stores a predetermined correction value, which corrects the second position information detected by the second encoder 62, in advance.

The second position detection unit 624 calculates the second position information indicating the information of the absolute position (rotation position) of the output shaft 27 based on the second position detection signal output by the light-emitting and -receiving element 623. The second position detection unit 624 outputs the calculated second position information to the controller 70. In addition, when the second position information is calculated, the second position detection unit 624 performs correction based on the predetermined correction value in which the calculated position information is stored in the correction value storage unit 625, and outputs the corrected position information as the second position information. For example, the second position detection unit 624 and the correction value storage unit 625 are provided at the second substrate 622.

As described above, the controller 70 generally controls the rotation mechanism 40, the torque-limiting mechanism 50, and the encoder device 60. For example, the controller 70 controls the rotation of the rotation mechanism 40 based on a control command supplied from a control device controlling the external robot apparatus 100. In addition, for example, the controller 70 outputs the detected position information (for example, the first position information, the second position information, or the like) detected by the encoder device 60 to the external control device. As shown in FIG. 12, the controller 70 includes a sliding determination unit 71 and a driving controller 72.

The sliding determination unit 71 determines the presence or absence of the sliding (relative displacement) by the above-described torque-limiting mechanism 50 based on the first position information detected by the first encoder 61 and the second position information detected by the second encoder 62. Here, the sliding by the torque-limiting mechanism 50 is generated when the torque equal to or greater than a predetermined allowable value is generated in at least one of the drive shaft 42 and the output shaft 27. For example, when an object comes into contact with the second arm 20, the sliding by the torque-limiting mechanism 50 is generated.

Moreover, the sliding determination unit 71 determines the presence or absence of the relative displacement based on estimation position information of the output shaft 27 estimated from the first position information detected by the first encoder 61 and the second position information detected by the second encoder 62. As an example, the sliding determination unit 71 compares the estimation position information of the output shaft 27 estimated from the first position information and the second position information detected by the second encoder 62, and when a difference between the two pieces of position information is equal to or greater than a predetermined threshold value, the sliding determination unit determines that the sliding by the torque-limiting mechanism 50 is generated. The sliding determination unit 71 outputs the determined result obtained by the torque-limiting mechanism 50 whether the relative displacement (for example, sliding) was presence or absence to the driving controller 72.

The driving controller 72 performs the control of the rotation mechanism 40 based on the control command supplied from the external control device and the first position information or the second position information detected by the encoder device 60. In addition, when the sliding determination unit 71 determines that the sliding (relative displacement) by the torque-limiting mechanism 50 is generated, the driving controller 72 performs control processing which controls the rotation of the drive shaft 42 by the rotation mechanism 40 and the return processing which eliminates the sliding by the torque-limiting mechanism 50. In addition, the driving controller 72 includes a rotation controller 73.

The rotation controller 73 includes a drive circuit (driving circuit) (not shown) which drives the driver 41. The rotation controller 73 controls the rotation of the driver 41 of the rotation mechanism 40 based on the control command supplied from the external control device and the first position information or the second position information detected by the encoder device 60. The rotation controller 73 controls the position and posture of the second arm 20 by controlling the rotation mechanism 40.

In addition, when the sliding determination unit 71 determines that the sliding (relative displacement) by the torque-limiting mechanism 50 is generated, the rotation controller 73 performs the control processing which controls the rotation of the drive shaft 42 by the rotation mechanism 40. For example, the control processing is a process which stops the rotation of the drive shaft 42 with respect to the rotation mechanism 40. That is, when an object comes into contact with or collides with the second arm 20, the rotation controller 73 performs a control which stops the operation so that the object or the robot apparatus 100 is not damaged.

Moreover, the control processing includes the return processing (displacement return processing) which eliminates the sliding by the torque-limiting mechanism 50. For example, when the sliding determination unit 71 determines that the sliding (relative displacement) by the torque-limiting mechanism 50 is generated, the rotation controller 73 performs the return processing (displacement return processing) which eliminates position deviation generated by the sliding of the torque-limiting mechanism 50 between the first encoder 61 and the second encoder 62.

As an example, as the return processing, the rotation controller 73 performs processing which changes a predetermined correction value stored in the correction value storage unit 618 so that the first position information detected by the first encoder 61 coincides with the estimation position information of the drive shaft 42 estimated from the second position information by the second encoder 62. The rotation controller 73 changes an offset value used for the correction by the first encoder 61 so that the first position information coincides with the second position information. Accordingly, the rotation controller 73 eliminates the position deviation generated by the sliding of the torque-limiting mechanism 50.

Next, operations of the driving apparatus 1 and the robot apparatus 100 will be described. When the driving apparatus 1 and the robot apparatus 100 are operated, the rotation controller 73 of the controller 70 controls the rotation of the driver 41 of the rotation mechanism 40 based on the control command supplied from the external control device and the first position information or the second position information detected by the encoder device 60, and rotates the drive shaft 42.

The rotation controller 73 operates the driver 41 of the rotation mechanism 40. According to this operation, the rotation of the driver 41 is reduced by the reduction gear 43 and is transmitted to the torque-limiting mechanism 50 via the transmission shaft 26. The rotation is transmitted to the output shaft 27 within a range which does not exceed the allowable value of the torque-limiting mechanism 50, and the output shaft 27 is rotated in the circumferential direction of the outer circumferential surface. In this way, the rotating force of the drive shaft 42 is transmitted to the output shaft 27. Accordingly, the second arm 20 is driven.

Next, an operation, in which the driving apparatus 1 detects the sliding (relative displacement) generated between the drive shaft 42 and the output shaft 27 by the torque-limiting mechanism 50, will be described. For example, when an object comes into contact or collides with the second arm 20 and the torque equal to or greater than the predetermined torque-allowable value in the torque-limiting mechanism 50 is applied between the drive shaft 42 and the output shaft 27, the sliding is generated between the drive shaft 42 and the output shaft 27 in the torque-limiting mechanism 50.

Figure 13:
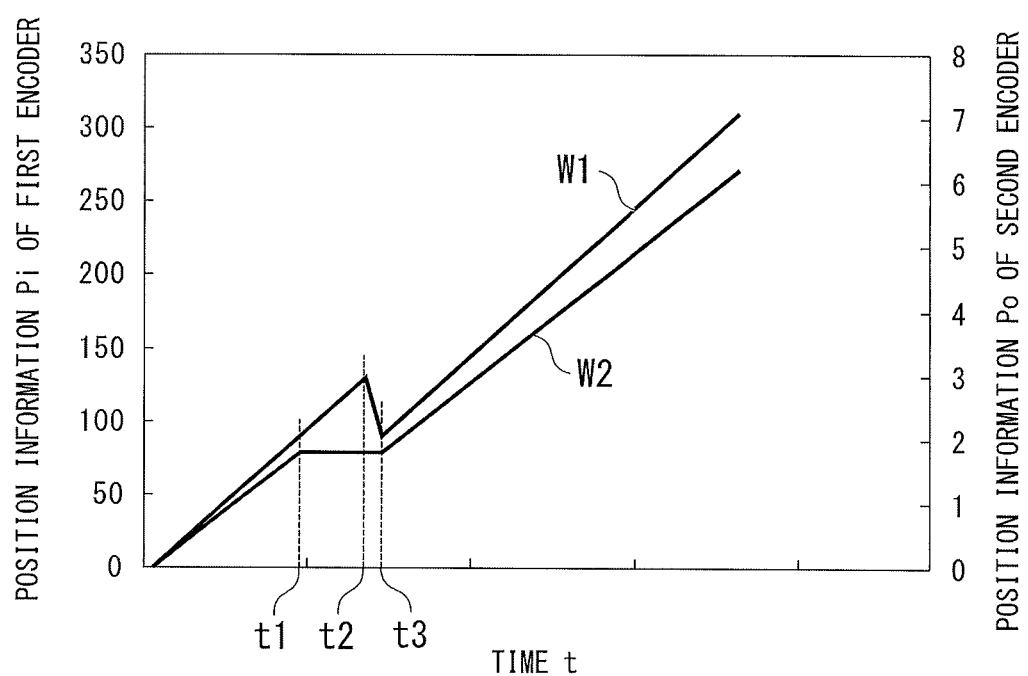
FIG. 13 is a graph showing an operation characteristic of the driving apparatus and the robot apparatus according to the second embodiment.

FIG. 13 is a view showing an example of the sliding detection of the driving apparatus 1 in the present embodiment.

In FIG. 13, a left vertical axis of a graph indicates position information Pi (first position information) of the first encoder 61, and a right vertical axis indicates position information Po (second position information) of the second encoder 62. In addition, a horizontal axis of the graph indicates a time t.

Moreover, a wave W1 indicates the displacement of the first position information Pi detected by the first encoder 61, and a wave W2 indicates the displacement of the second position information Po detected by the second encoder 62. Here, the second position information Po satisfies a relationship of (Po=Pi/n) by a gear ratio n of the reduction gear 43. In addition, in the present embodiment, as an example, the gear ratio n of the reduction gear 43 is "50".

FIG. 13 shows an example in which an object comes into contact with or collides with the second arm 20 at a time t1 and the torque equal to or greater than the predetermined torque-allowable value in the torque-limiting mechanism 50 is applied between the drive shaft 42 and the output shaft 27. As shown by the wave W2, since the second arm 20 comes into contact with the object at the time t1, the second position information Po which is the position information of the output shaft 27 is not changed. Meanwhile, as shown by the wave W1, since the sliding is generated by the torque-limiting mechanism 50, the first position information Pi which is the position information of the drive shaft 42 is continuously changed, similarly to the state before the contact or collision.

The sliding determination unit 71 determines the presence or absence of the sliding (relative displacement) by the above-described torque-limiting mechanism 50 based on the first position information detected by the first encoder 61 and the second position information detected by the second encoder 62. For example, the sliding determination unit 71 compares the estimation position information (Pi/n) of the output shaft 27 estimated from the first position information Pi detected by the first encoder 61, and the second position information Po detected by the second encoder 62. When the difference between the second position information Po and the estimation position information (Pi/n) of the output shaft 27 is equal to or greater than the predetermined threshold value, the sliding determination unit 71 determines that the sliding by the torque-limiting mechanism 50 is generated (refer to the time t2). In addition, the sliding determination unit 71 supplies the determined results to the rotation controller 73 of the driving controller 72.

Moreover, at the time t2, the sliding determination unit 71 determines that the sliding (relative displacement) by the torque-limiting mechanism 50 is generated, and the rotation controller 73 performs control processing, which controls the rotation of the drive shaft 42 in the rotation mechanism 40 by feeding back the determined results, based on the determined results. Here, as an example, the rotation controller 73 performs a process stopping the rotation of the drive shaft 42 with respect to the rotation mechanism 40, as the control processing. That is, when the object comes into contact with or collides with the second arm 20, the rotation controller 73 performs a control which stops the operation of the second arm 20 so that the object or the robot apparatus 100 is not damaged.

Moreover, the rotation controller 73 performs the return processing (displacement return processing), which eliminates the sliding by the torque-limiting mechanism 50, as the control processing. That is, at the time t2, the rotation controller 73 performs the return processing (displacement return processing) which eliminates the position deviation generated by the sliding of the torque-limiting mechanism 50 between the first encoder 61 and the second encoder 62. As an example, as the return processing, the rotation controller 73 performs processing which changes a predetermined correction value stored in the correction value storage unit 618 so that the first position information Pi detected by the first encoder 61 coincides with the estimation position information (n·Po) of the drive shaft 42 estimated from the second position information by the second encoder 62. First, the rotation controller 73 calculates a sliding amount ΔP (=Pi−n·Po) based on the estimation position information (n·Po) of the drive shaft 42 and the first position information Pi. The rotation controller 73 stores the calculated sliding amount ΔP in the correction value storage unit 618 as a predetermined correction value.

Accordingly, the sliding between the drive shaft 42 and the output shaft 27 is eliminated, and a relative positional relationship between the drive shaft 42 and the output shaft 27 is restored (refer to a time t3).

As described above, in the driving apparatus 1 in the present embodiment, the rotation mechanism 40 rotates the rotation drive shaft, the first encoder 61 detects the first position information indicating the rotation position of the drive shaft 42, and the second encoder 62 detects the second position information indicating the rotation position of the output shaft 27. In addition, the torque-limiting mechanism 50 can generate the relative displacement (sliding) with respect to the drive shaft 42 and the output shaft 27. In addition, the controller 70 (sliding determination unit 71) determines the presence or absence of the relative displacement (sliding) based on the first position information detected by the first encoder 61 and the second position information detected by the second encoder 62.

Accordingly, the driving apparatus 1 can appropriately detect that a driven body (for example, second arm 20) comes into contact with the object. In the driving apparatus 1 in the present embodiment, it is possible to decrease the damage of the contacted object or robot apparatus 100 as a result of the driven body (for example, second arm 20) coming into contact with the object.

In addition, in the present embodiment, when the relative displacement (sliding) is generated, the controller 70 (rotation controller 73) performs control processing which carries out a fully-closed control with respect to the rotation of the drive shaft 42 by the rotation mechanism 40. Accordingly, when the driven body (for example, second arm 20) comes into contact with the object, the rotation mechanism 40 is appropriately controlled. Therefore, in the driving apparatus 1 in the present embodiment, it is possible to decrease the damage of the contacted object or robot apparatus 100 as a result of the driven body (for example, second arm 20) coming into contact with the object.

Moreover, in the present embodiment, the control processing includes the return processing (displacement return processing) which eliminates the relative displacement (sliding). Therefore, after the driving apparatus 1 in the present embodiment detects that the driven body (for example, second arm 20) comes into contact with the object, the driving apparatus can perform a fully-closed control which resumes (returns) the operation of the robot apparatus 100.

In addition, in the present embodiment, the first encoder 61 outputs the position information, in which the detected position information is corrected based on a predetermined correction value, as the first position information. As the return processing (displacement return processing), the controller 70 (rotation controller 73) performs processing which changes a predetermined correction value so that the first position information coincides with the estimation position information of the drive shaft 42 estimated from the second position information. Accordingly, the relative displacement (sliding) can be eliminated by changing the predetermined correction value. In this case, in order to eliminate the relative displacement (sliding), processing which reversely rotates the rotation mechanism 40 or the like is not necessary. Accordingly, in the driving apparatus 1 in the present embodiment, a time until the operation of the robot apparatus 100 is resumed can be shortened.

In addition, in the present embodiment, the controller 70 (sliding determination unit 71) determines the presence or absence of the relative displacement (sliding) based on the estimation position information of the output shaft 27 estimated from the first position information, and the second position information. Accordingly, in the driving apparatus 1 of the present embodiment, the sliding (relative displacement) between the drive shaft 42 and the output shaft 27 can be correctly determined by simple determination means using the first encoder 61 and the second encoder 62.

In addition, in the present embodiment, one end of the drive shaft 42 is connected to the first encoder 61, and the other end of the drive shaft 42 is connected to the torque-limiting mechanism 50 via the reduction gear 43 (power transmission portion). Moreover, the drive shaft 42 is a hollow drive shaft which is formed in a hollow shape. At least a portion of the output shaft 27 is positioned at the inner side of the hollow drive shaft (drive shaft 42), one end of the output shaft 27 is connected to the driven body (for example, second arm 20) and the torque-limiting mechanism 50, and the other end of the output shaft 27 is connected to the second encoder 62. Accordingly, since the first encoder 61 and the second encoder 62 can be positioned at the drive shaft 42 side on which the rotation mechanism 40 is positioned, the first encoder 61 and second encoder 62 and the rotation mechanism 40 can be integrally structured. Therefore, a size in the driving apparatus 1 can be decreased.

Moreover, since the second encoder 62 is positioned at the side opposite to the driver 41, it is unnecessary to consider about erroneous detection due to oil, dirt, or the like, to which the driver 41 is subjected for the second encoder 62. For example, when the second encoder 62 is positioned at the side (the same side as the first encoder 61) opposite to the driver 41 using the hollow drive shaft, similar to the first encoder 61, the second encoder 62 can be accommodated in the arm or driving apparatus and can exist in the integral structure. Here, since the inner portion of the arm or driving apparatus is configured to be separated from the external oil or dirt by a seal or the like, it is unnecessary to consider about erroneous detection due to oil, dirt, or the like for the second encoder 62. Accordingly, in the driving apparatus 1 of the present embodiment, a light detection type encoder can be applied to the second encoder 62. The driving apparatus 1 of the present embodiment can detect the position information of the output shaft 27 with high accuracy.

In addition, in the present embodiment, the robot apparatus 100 includes the driving apparatus 1. Accordingly, the robot apparatus 100 of the present embodiment can appropriately detect that the driven body (for example, second arm 20) comes into contact with the object. Therefore, in the robot apparatus 100 in the present embodiment, it is possible to decrease the damage of the contacted object or robot apparatus 100 as a result of the driven body (for example, second arm 20) coming into contact with the object.

Moreover, in the present embodiment, the driving apparatus 1 includes the first encoder 61 and the second encoder 62. Since the position information of the drive shaft 42 and the output shaft 27 can be correctly detected by two encoders, the driving apparatus 1 of the present embodiment can correctly detect not only the sliding by the torque-limiting mechanism 50 but also vibration, warp, speed deviation, or the like of the output shaft 27.

The technical scope of the present invention is not limited to the above-described embodiment and can be appropriately changed within a scope which does not depart from the gist of the present invention.

For example, in the above-described embodiment, the configuration in which the outer circumferential surface 600*a* of the position reference unit 600 is set to the position reference is described as an example. However, the present invention is not limited thereto. For example, the present invention may include a configuration in which the inner circumferential surface 600*b* of the position reference unit 600 is set to the position reference.

Moreover, if the outer circumferential surface 600*a* and the inner circumferential surface 600*b* are cylindrical surfaces which have the axial line C as the center, for example, the present invention may include a configuration in which one of the first frame member 691 and the second frame member 692 abuts the outer circumferential surface 600*a* of the position reference unit 600 and is positioned, and the other abuts the inner circumferential surface 600*b* and is positioned. In this case, the position reference becomes the axial line C.

Moreover, in the above-described embodiment, the aspect is described in which the controller 70 (sliding determination unit 71) determines the presence or absence of the relative displacement (sliding) based on the estimation position information of the output shaft 27 estimated from the first position information and the second position information. However, the present invention is not limited thereto. For example, the present invention may include an aspect in which the controller 70 (sliding determination unit 71) determines the presence or absence of the relative displacement (sliding) based on the estimation position information of the drive shaft 42 estimated from the second position information and the first position information. Accordingly, the driving apparatus 1 can correctly determine the sliding (relative displacement) between the drive shaft 42 and the output shaft 27 by the simple determination means using the first encoder 61 and the second encoder 62.

In addition, the present invention may include an aspect in which the controller 70 (sliding determination unit 71) determines the presence or absence of the relative displacement (sliding) by combining the determination method using the estimation position information of the drive shaft 42 estimated from the above-described second position information and the determination method using the estimation position information of the output shaft 27 estimated from the first position information.

Moreover, in the above-described embodiment, the aspect is described in which the controller 70 (sliding determination unit 71) determines the presence or absence of the relative displacement (sliding) by the sliding amount $\Delta P$ ($=Pi-n\cdot Po$) calculated based on the first position information $Pi$ and the second position information $Po$. However, the present invention may include an aspect in which the presence or absence of the relative displacement (sliding) is determined based on the calculated results such as a ratio between the first position information $Pi$ and the second position information $Po$.

In addition, in the present embodiment, the aspect is described in which the controller 70 (rotation controller 73) performs the processing, which changes the predetermined correction value so that the first position information coincides with the estimation position information of the drive shaft estimated from the second position information, as the return processing (displacement return processing). However, the present invention is not limited thereto. For example, the present invention may include an aspect in which the controller 70 (rotation controller 73) performs processing which changes a predetermined correction value of the second encoder 62 so that the second position information coincides with the estimation position information of the output shaft 27 estimated from the first position information, as the return processing.

Moreover, in the above-described embodiment, the configuration in which at least a portion of the torque-limiting mechanism 50 is connected to the second arm 20 is described as an example. However, the present invention is not limited thereto. For example, the present invention may include an aspect in which the torque-limiting mechanism 50 is connected to an external connection portion and is provided to be independent of the second arm 20.

In addition, in the above-described embodiment, the aspect is described in which the drive shaft 42 is connected to the torque-limiting mechanism 50 via the reduction gear 43. However, the present invention may include an aspect in which the reduction gear 43 is not provided. Moreover, the present invention may include an aspect in which the first encoder 61 is connected to the drive shaft 42, in which the speed is reduced via the reduction gear 43, and in which the rotation position information in which the speed is reduced via the reduction gear 43 is detected.

In addition, in the above-described embodiment, the case is described in which the first encoder 61 and the second encoder 62 are the optical encoder using the light-emitting and -receiving elements (613 and 623). However, the present invention may be an aspect which includes other types (for example, a magnetic type or the like) of encoders.

Moreover, in the above-described embodiment, the aspect is described in which the first position detection unit 617 and the correction value storage unit 618 are provided at the first substrate 612. However, the present invention may include an aspect in which the first position detection unit 617 and the correction value storage unit 618 are provided at the outside similar to the controller 70. In addition, the present invention may include an aspect in which the controller 70 is provided at the first substrate 612 along with the first position detection unit 617 and the correction value storage unit 618.

Moreover, in the above-described embodiment, the aspect is described in which the second position detection unit 624 and the correction value storage unit 625 are provided at the second substrate 622. However, the present invention may include an aspect in which the second position detection unit 624 and the correction value storage unit 625 are provided at the outside, similarly to the controller 70. Moreover, the present invention may include an aspect in which the controller 70 is provided at the second substrate 622 along with the second position detection unit 624 and the correction value storage unit 625.

A computer system is provided in the inner portion of the above-described controller 70. In addition, the processing process of the above-described controller 70 is stored in a computer-readable recording medium according to a program type, and the processing is performed by reading and carrying out the program by the computer. Here, the computer-readable recording medium includes a magnetic disk, an optical magnetic disk, a CD-ROM, a DVD-ROM, a semiconductor memory, or the like. In addition, the computer program is distributed to the computer by a communication line, and the computer receiving the distribution may perform the program.

Moreover, in a robot or a machine tool (hereinafter, referred to as a robot apparatus) having an arm, since a tip side arm is inserted into a narrow region due to an operation characteristic of the robot apparatus, thinness and a decrease in the size of the arm are preferred if possible. For example, when an additional part such as an output side encoder (for example, second encoder) is mounted, generally, the additional part should be mounted on the output side due to characteristics in which the additional part is the output side encoder, the output side in the arm of the robot apparatus is the tip side, and thus, it is necessary for the output side encoder to be mounted on the tip side arm. Accordingly, the increase in the volume of the tip side arm cannot be avoided, and a decrease in the size cannot be achieved. However, in the present embodiment, since the second encoder 62 can be positioned at the base side arm which is on the same side as the first encoder 61 by using the hollow drive shaft formed in a hollow shape (the detection unit of the second encoder 62 is fixed to the base side arm and is not rotated along with the tip side arm), the second encoder 62 is not mounted on the tip side arm, and thus, double encoders can be configured in a state where a decrease in the volume of the tip side arm is realized.

In addition, generally, since the output side encoder is mounted on the outside of the tip side arm so as not to be rotated along with the tip side arm in order to detect the rotation angle of the output side while being mounted on the tip side arm, the detection unit of the output side encoder is exposed to the external environment. If it is considered that the use environment of the robot apparatus is not always an environment in which dust or oil is not scattered, the detection unit of the output side encoder is likely to be polluted. However, according to the structure of the present embodiment, the output side encoder can be mounted on the base side arm similar to the input side encoder. Here, the base side arm, on which the input side encoder is mounted, is present as the base of joints thereof, and thus, the base side arm is not rotated. Accordingly, similar to the input side encoder, the output side encoder is accommodated in the inner portion of the arm, and thus, the detection unit can be protected from outside dust or oil. Therefore, similar to the input side encoder, the output side encoder of the present embodiment is not easily polluted, and thus, resistance with respect to the pollution or the like can be increased.

The invention claimed is:

1. An encoder comprising:
a first rotator connectable to a rotating shaft and including a first pattern;
a first detection unit positioned at a non-rotatory member and configured to detect the first pattern;
a second rotator connectable to an output shaft that is rotatable around a predetermined axis and configured to output rotation caused by the rotating shaft, the second rotator including a second pattern;
a second detection unit positioned at the non-rotatory member and configured to detect the second pattern; and
a reference unit configured to position the first detection unit and the second detection unit by a common position reference,
wherein the non-rotatory member abuts with the reference unit, and the first detection unit and the second detection unit abut with the non-rotatory member.

2. The encoder according to claim 1,
wherein the common position reference is provided on a surface of a cylinder having the predetermined axis as a center.

3. The encoder according to claim 1, wherein
the first rotator is connectable to one end of a first shaft which is a hollow member, and
the second rotator is connectable to a portion of a second shaft that passes through the hollow member, the portion protruding from the one end of the first shaft.

4. The encoder according to claim 3, wherein the encoder is configured to detect rotation information of a drive source which drives a joint of a robot apparatus with an arm.

5. The encoder according to claim 1, further comprising:
a first alignment member configured to align an abutment position between the first detection unit and the reference unit abutting the first detection unit.

6. The encoder according to claim 5, wherein the first alignment member includes:
a first recessed portion provided at a first one of the reference unit and the first detection unit; and
a first protruding portion provided at a second opposite one of the reference unit and the first detection unit, the first protruding portion being inserted into the first recessed portion.

7. The encoder according to claim 5, further comprising:
a second alignment member configured to align an abutment position between the second detection unit and the reference unit abutting the second detection unit.

8. The encoder according to claim 7,
wherein the second alignment member includes:
a second recessed portion provided at a first one of the reference unit and the second detection unit; and
a second protruding portion provided at a second opposite one of the reference unit and the second detection unit, the second protruding portion being inserted into the second recessed portion.

9. The encoder according to claim 1, wherein
the non-rotatory member includes a magnetic field generator, and
the encoder comprises a yoke configured to shield a magnetic field toward the first pattern and the second pattern from the magnetic field generator.

10. The encoder according to claim 1,
wherein the output shaft is rotatably supported in an independent manner relative to the rotating shaft via a bearing.

11. A torque-limiting mechanism comprising:
a rotating shaft rotatable around a predetermined axis by driving of a driver;
an output shaft which is rotatable around the predetermined axis and configured to output rotation caused by the rotating shaft;
a connection member configured to connect between the rotating shaft and the output shaft and to relatively displace the rotating shaft and the output shaft when torque transmitted from the rotating shaft to the output shaft exceeds a predetermined value; and
the encoder according to claim 1 connected to the rotating shaft and the output shaft and configured to detect rotation information of the rotating shaft and the output shaft.

12. A driving apparatus comprising:
a driver;
a rotating shaft rotatable around a predetermined axis by driving of the driver;
an output shaft rotatable around the predetermined axis and configured to output rotation of the rotating shaft; and
the encoder according to claim 1 connected to the rotating shaft and the output shaft and configured to detect rotation information of the rotating shaft and the output shaft.

13. The driving apparatus according to claim 12, further comprising:
a connection member configured to connect between the rotating shaft and the output shaft and to relatively displace the rotating shaft and the output shaft when torque transmitted from the rotating shaft to the output shaft exceeds a predetermined value.

14. A robot apparatus comprising:
an arm; and
the driving apparatus according to claim 12 configured to drive the arm.

15. The encoder according to claim 1, further comprising:
an alignment member configured to align an abutment position between the second detection unit and the reference unit abutting the second detection unit.

16. The encoder according to claim 15, wherein the alignment member includes:
a recessed portion provided at a first one of the reference unit and the second detection unit; and
a protruding portion provided at a second opposite one of the reference unit and the second detection unit, the protruding portion being inserted into the recessed portion.

17. An encoder installation method comprising:
coupling a first rotator having a first pattern to a rotating shaft;
providing a first detection unit on a non-rotatory member such that the first detection unit abuts with the non-rotatory member and such that the first detection unit is positioned by a predetermined position reference which is set at a reference unit, the non-rotatory member abutting with the reference unit, the first detection unit being configured to detect the first pattern;
coupling a second rotator having a second pattern to an output shaft, the output shaft being rotatable about a predetermined axis and configured to output rotation of the rotating shaft; and
providing a second detection unit on the non-rotatory member such that the second detection unit abuts with the non-rotatory member and such that the second detection unit is positioned by the position reference, the second detection unit being configured to detect the second pattern.

18. The encoder installation method according to claim 17, further comprising:
providing the reference unit on the non-rotatory member before positioning the first detection unit and the second detection unit.

19. The encoder installation method according to claim 17, further comprising:
positioning the reference unit relative to the predetermined axis before providing the reference unit on the non-rotatory member.

\* \* \* \* \*